US011326617B2

(12) United States Patent
Greene et al.

(10) Patent No.: US 11,326,617 B2
(45) Date of Patent: May 10, 2022

(54) BOOST COMPRESSOR ASSEMBLY

(71) Applicant: UNITED TECHNOLOGIES CORPORATION, Farmington, CT (US)

(72) Inventors: Christopher Britton Greene, East Hartford, CT (US); Dustin Joseph Frohnapfel, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 248 days.

(21) Appl. No.: 16/742,591

(22) Filed: Jan. 14, 2020

(65) Prior Publication Data
US 2021/0215168 A1 Jul. 15, 2021

(51) Int. Cl.
F04D 29/36 (2006.01)
F02C 3/06 (2006.01)
F02K 3/06 (2006.01)
F01D 7/02 (2006.01)

(52) U.S. Cl.
CPC .............. F04D 29/366 (2013.01); F02C 3/06 (2013.01); F02K 3/06 (2013.01); F01D 7/02 (2013.01); F05D 2240/80 (2013.01); F05D 2260/52 (2013.01)

(58) Field of Classification Search
CPC ........ F04D 29/366; F04D 29/323; F02C 3/06; F01D 17/162; F05D 2260/52; F05D 2260/56; F02K 3/06
See application file for complete search history.

(56) References Cited

U.S. PATENT DOCUMENTS 7,614,210 B2 * 11/2009 Powell .................... F02K 3/075
60/226.3
8,807,939 B2 8/2014 Gardas
8,907,939 B2 * 12/2014 Liu ....................... G09G 3/2096
345/212
10,174,763 B1 * 1/2019 Orosa .................... F01D 5/022
2018/0093754 A1 4/2018 Cheung

FOREIGN PATENT DOCUMENTS

JP 2008215275 9/2008

* cited by examiner

Primary Examiner — David E Sosnowski
Assistant Examiner — Maxime M Adjagbe
(74) Attorney, Agent, or Firm — Snell & Wilmer L.L.P.

(57) ABSTRACT

A boost compressor assembly may comprise an outer annular structure and a plurality of blades. Each blade in the plurality of blades may be moveably coupled to the outer annular structure. The plurality of blades may be configured to deploy in response to the boost compressor assembly rotating. The plurality of blades may be configured to retract when the boost compressor assembly stops rotating.

21 Claims, 8 Drawing Sheets

BOOST COMPRESSOR ASSEMBLY

GOVERNMENT LICENSE RIGHTS

This invention was made with Government support under FA8650-18-F-2077 awarded by the United States Air Force. The Government has certain rights in this invention.

FIELD

The present disclosure is directed to rotating detonation engines and gas turbine engines and, more particularly, to boost compressor assemblies for rotating detonation engines and gas turbine engines.

BACKGROUND

Gas turbine engines include a compressor section, a turbine section, and a combustor section. The compressor section receives air from the environment and uses various rotors and stators to compress the air. The combustor section receives the compressed air, adds fuel, mixes the compressed air and fuel, and combusts the mixture to generate hot/heated exhaust gases. Exhaust from the combustor section is received by the turbine section which converts the expanding heated flow into torque, some of which may be transferred to the compressor section. Recently, various entities have begun researching the use of rotating detonation engines as combustors for gas turbine engines and other direct thrust applications such as ramjet combustors. Such rotating detonation engines operate based on a mixture of an oxidizer and a fuel. It is desirable for the oxidizer and the fuel to be well-mixed prior to detonation.

SUMMARY

A boost compressor assembly is disclosed herein. The boost compressor may comprise: an outer annular structure including an aperture disposed radially through the outer annular structure; and a blade including a platform and an airfoil, the blade moveably coupled to the outer annular structure, the airfoil configured to deploy from the outer annular structure from a retracted state to a deployed state.

In various embodiments, the boost compressor may further comprise an inner annular structure disposed radially inward from the outer annular structure and a link assembly coupled to the inner annular structure and the platform. The boost compressor may further comprise a spring coupled to the inner annular structure and the link assembly. The link assembly may comprise a joint coupling a first link to a second link, and wherein the spring is coupled to the joint. The boost compressor assembly may further comprise an intermediate annular structure disposed between the outer annular structure and the inner annular structure, wherein the intermediate annular structure comprises a radial slot, and wherein at least a portion of the joint is disposed in the radial slot. The joint may be configured to travel radially within the radial slot. The blade may be pivotably coupled to the outer annular structure. The airfoil may be configured to travel radially outward through the aperture when transitioning from the retracted state to the deployed state. The airfoil may be disposed radially inward from the outer annular structure when the blade is in the retracted state, and the airfoil may be disposed radially outward from the outer annular structure in the deployed state. The blade may be configured to transition from the retracted state to the deployed state in response to rotating the boost compressor assembly. The blade may be configured to transition from the deployed state to the retracted state in response to stopping the boost compressor assembly.

A gas turbine engine is disclosed herein. The gas turbine engine may comprise: a fan blade disposed in a fan section of the gas turbine engine; and a boost compressor assembly disposed aft of the fan blade, the boost compressor configured to increase a pressure produced by the fan blade when the boost compressor assembly is in operation, the boost compressor assembly comprising: an outer annular structure; and a blade coupled to the outer annular structure.

In various embodiments, the boost compressor of the gas turbine engine may further comprise an inner annular structure disposed radially inward from the outer annular structure and a link assembly coupled to the inner annular structure and the blade. The boost compressor assembly may further comprise a spring coupled to the link assembly and the inner annular structure. The link assembly may comprise a joint coupling a first link to a second link, and wherein the spring is coupled to the joint. The boost compressor assembly may further comprise an intermediate annular structure disposed between the outer annular structure and the inner annular structure, wherein the intermediate annular structure comprises a radial slot, and wherein at least a portion of the joint is disposed in the radial slot. The joint may be configured to travel radially within the radial slot. An airfoil of the blade may be configured to travel radially outward through an aperture of the outer annular structure when transitioning from a retracted state to a deployed state. The airfoil may be disposed radially inward from the outer annular structure when the blade is in the retracted state, and the airfoil may be disposed radially outward from the outer annular structure in the deployed state. The blade may be moveably coupled to the outer annular structure.

A rotating detonation engine is disclosed herein. The rotating detonation engine may comprise: a boost compressor assembly configured to increase a ram compression of the rotating detonation engine, the boost compressor assembly comprising: an outer annular structure; and a blade moveably coupled to the outer annular structure, the blade configured to deploy in response to rotating the boost compressor assembly, the blade configured to retract when the boost compressor assembly stops rotating.

The features and elements identified herein may be combined in any of the various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
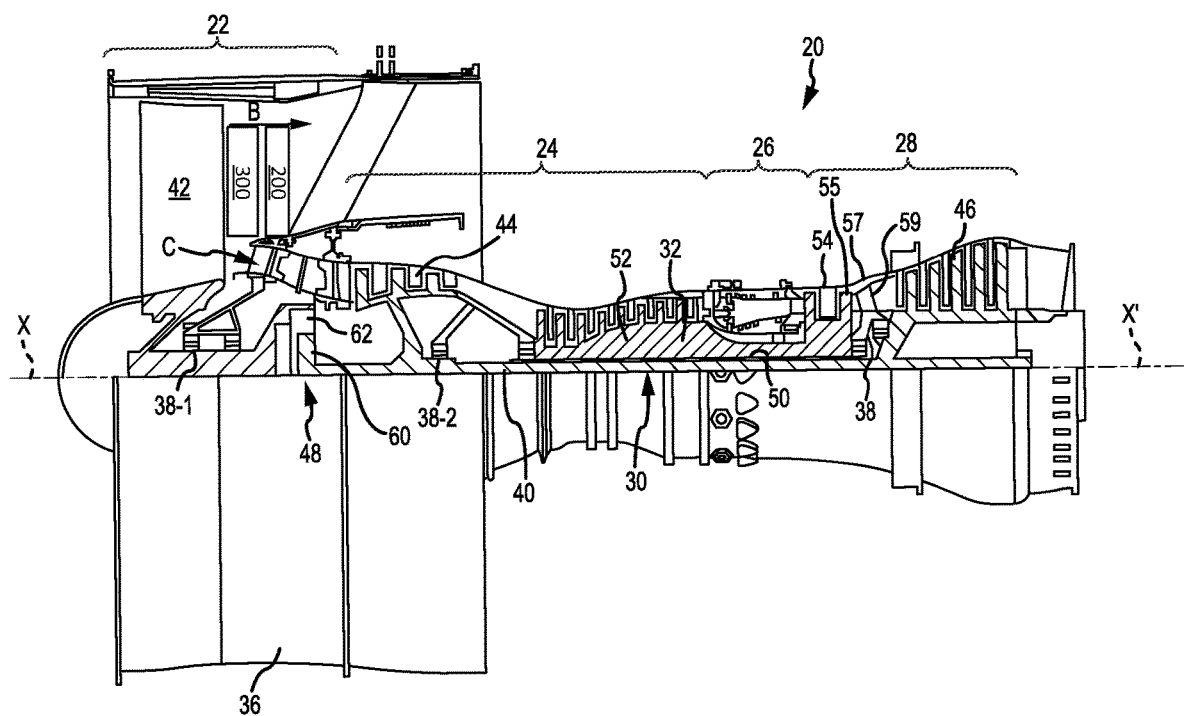
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. In various embodiments, the low pressure compressor 44 may comprise a boost compressor 300, as disclosed further herein. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. In various embodiments, a high pressure compressor 52 may comprises a boost compressor 300, as disclosed further herein. A rotating detonation engine 200 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of planet gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis X-X'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

In various embodiments, the gas-turbine engine 20 may further comprise a boost compressor assembly 300 and a rotating detonation engine disposed in fan section 22. The boost compressor assembly 300 may be disposed aft of fan 42. The boost compressor assembly 300 may be disposed between fan 42 and the rotating detonation engine 200. In various embodiments, the boost compressor assembly 300 may comprise fixed blades. In various embodiments, the boost compressor assembly 300 may be configured to deploy a plurality of blades and/or add work to flow by increasing a pressure provided by the fan 42. The boost compressor assembly 300 may be configured to retract when there is sufficient air pressure from the fan 42 to operate the gas turbine engine 20.

Figure 2:
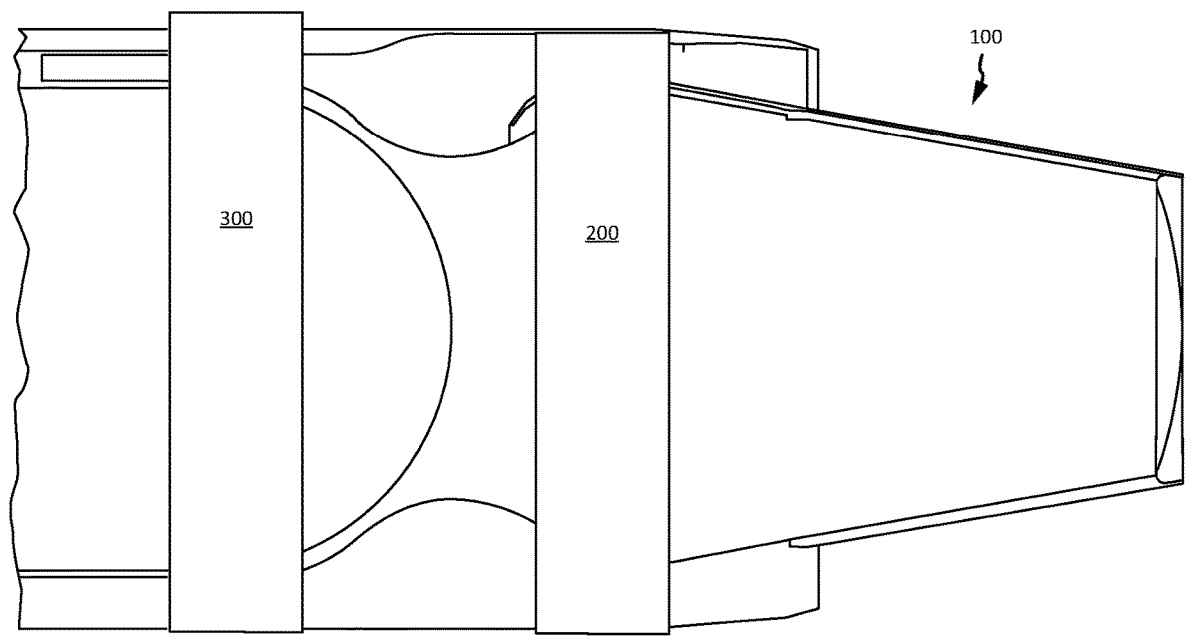
FIG. 2 illustrates a portion of a rotating detonation engine, in accordance with various embodiments.

Referring now to FIG. 2, a portion of a vehicle assembly 100, in accordance with various embodiments, is illustrated. The vehicle assembly 100 may comprise a rotating detonation engine 200 and a boost compressor assembly 300. The boost compressor assembly 300 may be disposed forward of the rotating detonation engine 200. Air may flow in an inlet of the rotating detonation engine and be pressurized via ram compression. In various embodiments, the boost compressor assembly 300 may be configured to increase the ram compression. In typical rotating detonation engines, there may be a risk that ram air pressure at low Mach speeds may be insufficient for initiating and sustaining detonation. By increasing the ram compression, the boost compressor assembly may allow initiation of the rotating detonation engine 200 at higher altitudes, lower speeds, or the like. In this regard, the boost compressor assembly 300 may improve a flight envelope for the rotating detonation engine 200. Similarly, in various embodiments, the rotating detonation engine 200 may be able to be dropped from lower altitudes than a typical rotating detonation engine. The boost compressor assembly 300 may be deployed to provide additional ram air pressure at low Mach speeds. In various embodiments, the boost compressor assembly 300 may retract when the rotating detonation engine 200 produces enough ram pressure and/or the additional pressure is no longer needed.

Figure 3:
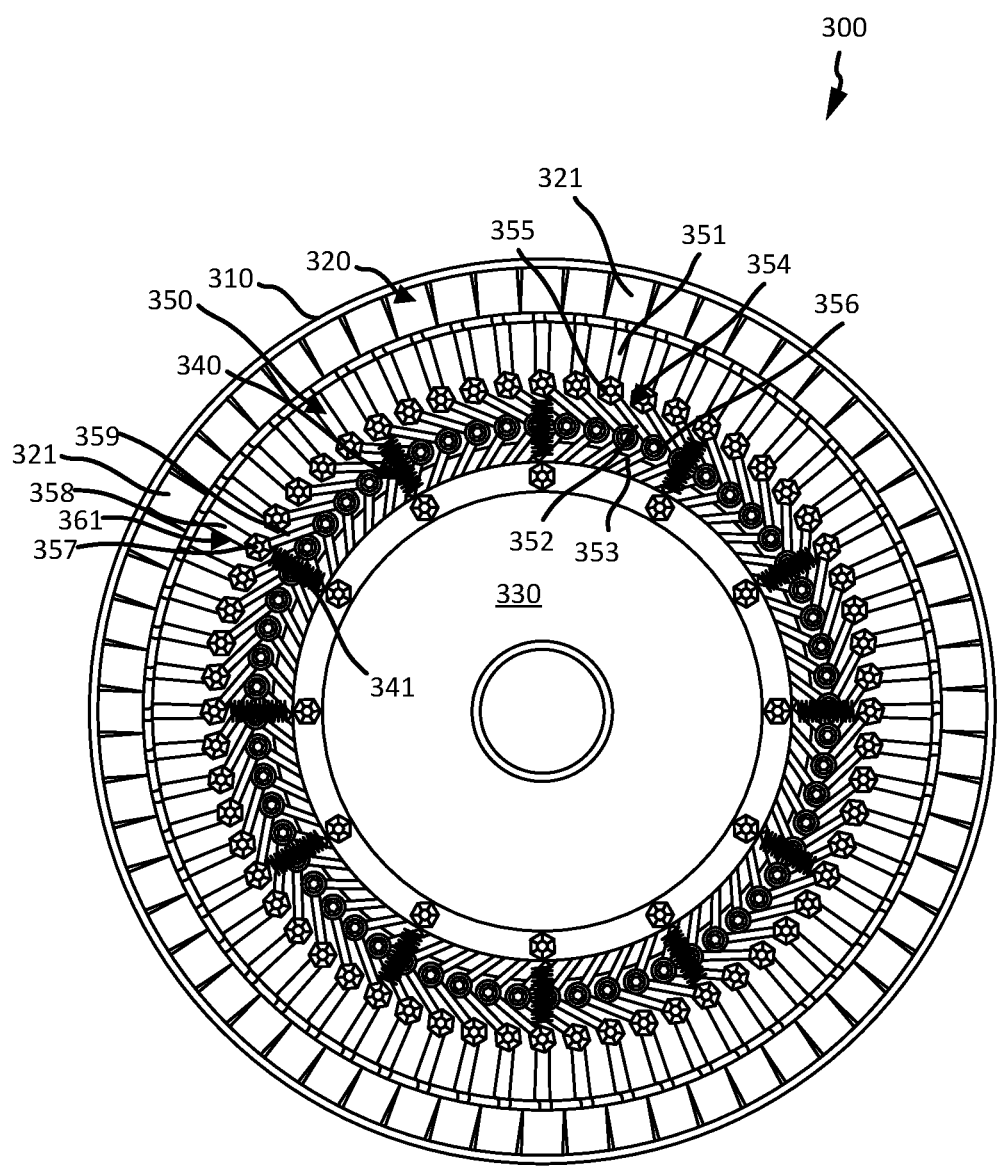
FIG. 3 illustrates a boost compressor assembly in a retracted state, in accordance with various embodiments.

Referring now to FIG. 3, a front view of a boost compressor assembly 300 in a retracted state, in accordance with various embodiments, is illustrated. The boost compressor assembly 300 may comprise an outer annular structure 310, an inner annular structure 330, and a plurality of blades 320. The plurality of blades 320 may be disposed radially inward of the outer annular structure 310 in the retracted state. The plurality of blades 320 may be moveably coupled to the inner annular structure 330. The plurality of blades 320 may be configured to deploy radially outward through the outer annular structure 310. In various embodiments, the plurality of blades 320 may be configured to deploy in response to rotating the boost compressor assembly 300. The outer annular structure 310, the inner annular structure 330, and the plurality of blades 320 may be made of any material known in the art, such as aluminum or the like.

In various embodiments, the boost compressor assembly 300 may further comprise a plurality of springs 340 and a plurality of links 350. The plurality of links 350 may be disposed radially between the outer annular structure 310 and the inner annular structure 330. Each blade in the plurality of blades 320 may be coupled to the inner annular structure via a respective outer link, a respective intermediate link, and a respective inner link of the plurality of links 350. For example, a first blade 321 in the plurality of blades 320 is coupled to the inner annular structure 330 via outer link 351, intermediate link 352 and inner link 353. Each link may be coupled to an adjacent link by any method known in the art, such as a fastener or the like. As the first blade 321 deploys from the retracted state, the outer link 351, intermediate link 352, and inner link 353 may collapse inward and the first link assembly 354 may straighten out.

In various embodiments, the first link assembly 354 may further comprise a first joint 355 coupling the outer link 351 to the intermediate link 352 and a second joint 356 coupling the intermediate link 352 to the inner link 353. As the first blade 321 deploys from the retracted state, the first joint 355 and the second joint 356 may be configured to travel radially outward toward the outer annular structure 310. In various embodiments, each spring in the plurality of springs 340 may be coupled to the inner annular structure 330 and a first joint of a blade link assembly in the plurality of blades. For example, a second link assembly 361 may comprise an outer link 358, an intermediate link 359, and a first joint 357 coupling the outer link 358 to the intermediate link 359. The first joint 357 may be coupled to a spring 341 in the plurality of springs 340. The spring 341 may be disposed between the first joint 357 of the link assembly and a joint 331. The joint 331 may couple the spring 341 to the inner annular structure 330. The spring 341 may be compressed when the boost compressor assembly 300 is in a retracted state. In various embodiments, the number of link assemblies to springs may be between 1:1 and 10:1, or between 2:1 and 8:1, or between 4:1 and 6:1.

In various embodiments, the plurality of blades 320 may be configured to deploy radially outward in response to the boost compressor assembly 300 rotating. For example, the plurality of blades 320 may experience a centrifugal force in response to the boost compressor assembly 300. The centrifugal force may be greater than a spring force of the plurality of springs 140 in the deployed state. In various embodiments, the plurality of blades 320 may be configured to retract in response to the boost compressor assembly 300 stopping the rotating.

Figure 4:
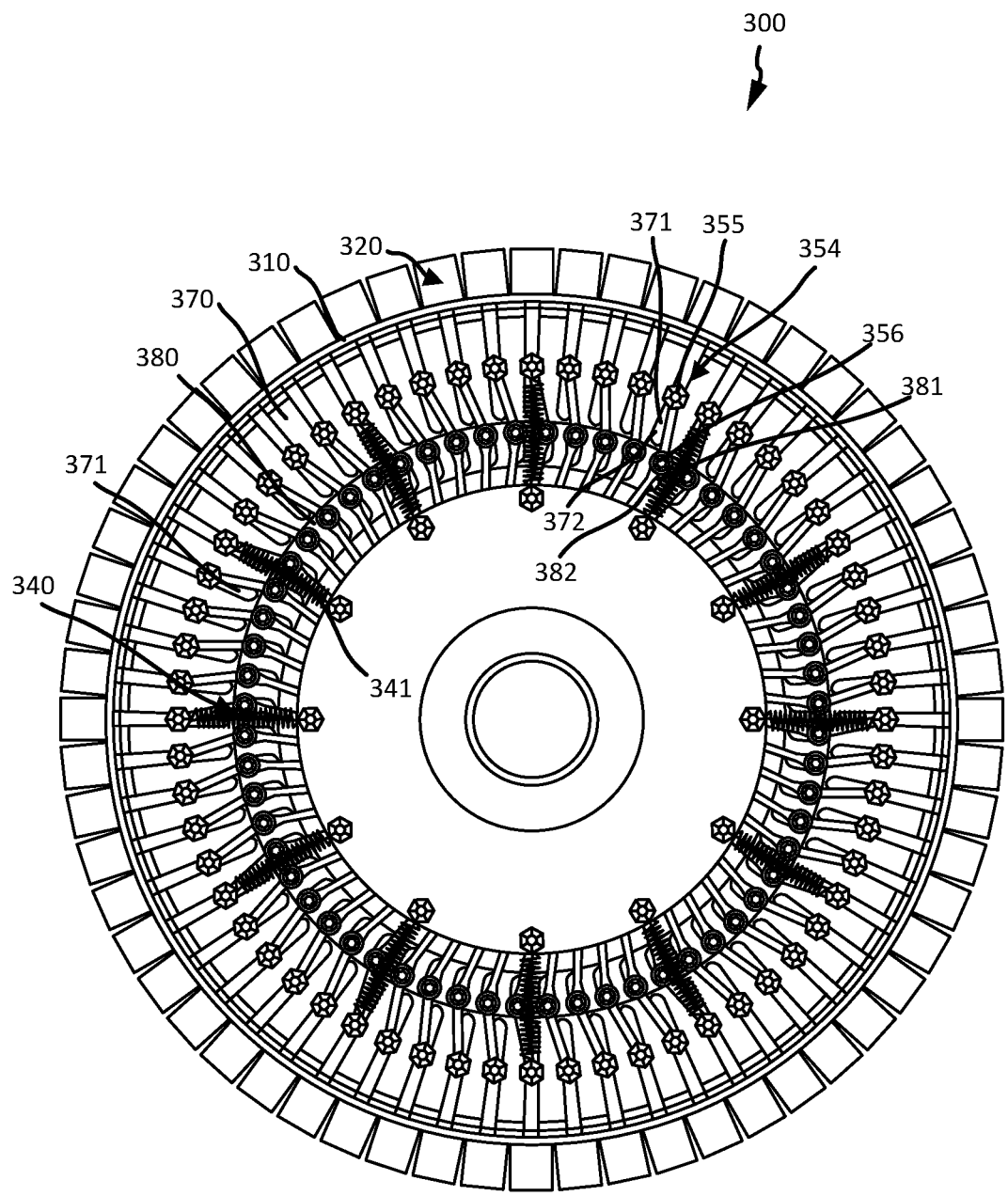
FIG. 4 illustrates a boost compressor assembly in a deployed state, in accordance with various embodiments.

Referring now to FIG. 4, a boost compressor assembly 300 in a deployed state is illustrated. A "deployed state" as defined herein is when the plurality of blades 320 extend radially outward from the outer annular structure 310. The boost compressor assembly 300 may be configured to rotate when in the deployed state. In various embodiments, the boost compressor assembly 300 may be configured to increase a ram compression when in the deployed state.

In various embodiments, the boost compressor assembly 300 further comprises a first intermediate annular structure 370 and a second intermediate annular structure 380 disposed between the outer annular structure 310 and the inner annular structure 330. The first intermediate annular structure 370 may comprise a plurality of apertures 371 disposed therein. Each aperture in the plurality of apertures 371 may comprise a radial slot. For example, aperture 371 may comprise a radial slot 372. In various embodiments, each aperture in the plurality of apertures 371 may be configured to guide a first joint of a respective link assembly. For example, first joint 355 of first link assembly 354 may be disposed in the aperture 371. The first joint 355 may be configured to travel radially within the aperture 371.

Similarly, the second intermediate annular structure 380 may comprise a plurality of apertures 381. Each aperture in the plurality of apertures 381 may comprise a radial slot. For example, aperture 381 may comprise a radial slot 382. In various embodiments, each aperture in the plurality of apertures 381 may be configured to guide a second joint of a respective link assembly. For example, second joint 356 of first link assembly 354 may be disposed in the aperture 381. The second joint 356 may be configured to travel radially with the aperture 381.

In various embodiments, each spring in the plurality of springs 340 may be in tension when the boost compressor assembly 300 is in a deployed state. Each link assembly may straighten out in the compressed state. For example, first link assembly 354 straightened out from a zig-zag formation in the retracted state to nearly linear formation in the deployed state.

Figure 5:
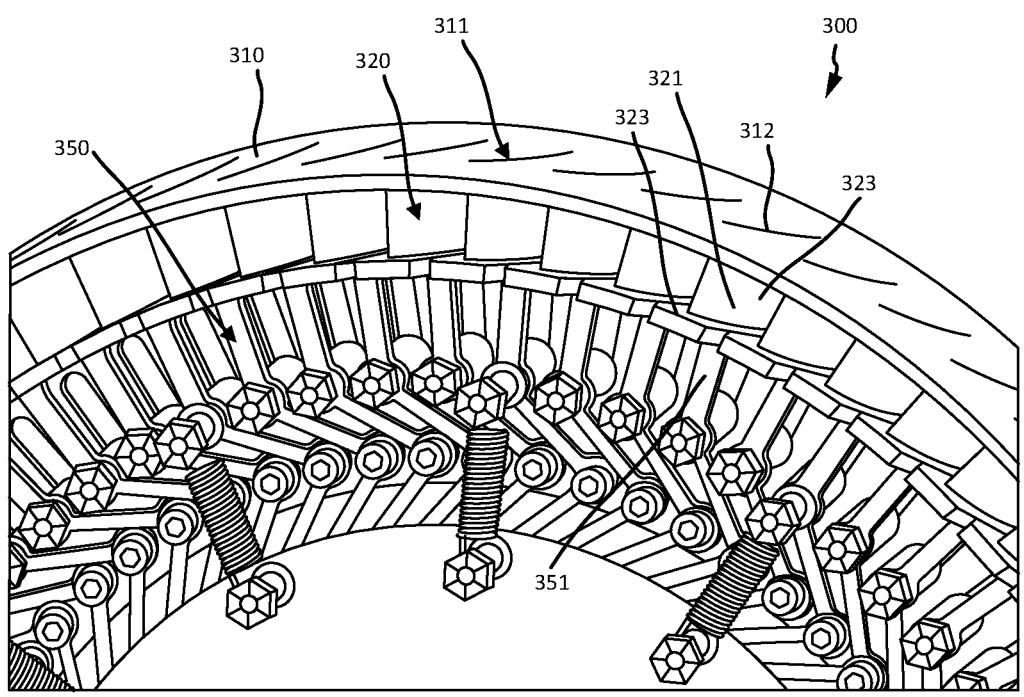
FIG. 5 illustrates a portion of a boost compressor assembly in a retracted state, in accordance with various embodiments.

Referring now to FIG. 5, a perspective view of a portion of a boost compressor assembly 300 in a retracted state, in accordance with various embodiments, is illustrated. The outer annular structure 310 of the boost compressor assembly 300 may further comprise a plurality of apertures 311. Each aperture 312 in the plurality of apertures 311 may correspond to a blade in the plurality of blades 320. For example, aperture 312 in the plurality of apertures 311 may be configured to receive the first blade 321 in the plurality of blades 320. In various embodiments, each blade in the plurality of blades 320 may comprise a platform and an airfoil. For example, first blade 321 may comprise a platform 322 and an airfoil 323.

The airfoil 323 may extend radially outward from the platform 322. Each platform may be separated from an adjacent platform. The aperture 312 may have a shape complimentary to a shape of the airfoil shape of first blade 321. The aperture 312 may be configured to receive the airfoil. The platform 322 may abut a radially inner surface of outer annular structure 310 in deployed state. Each platform may be coupled to a respective outer link in the plurality of links 350. For example, outer link 351 may be coupled to platform 322 and/or integrally formed with airfoil 323.

Figure 6:
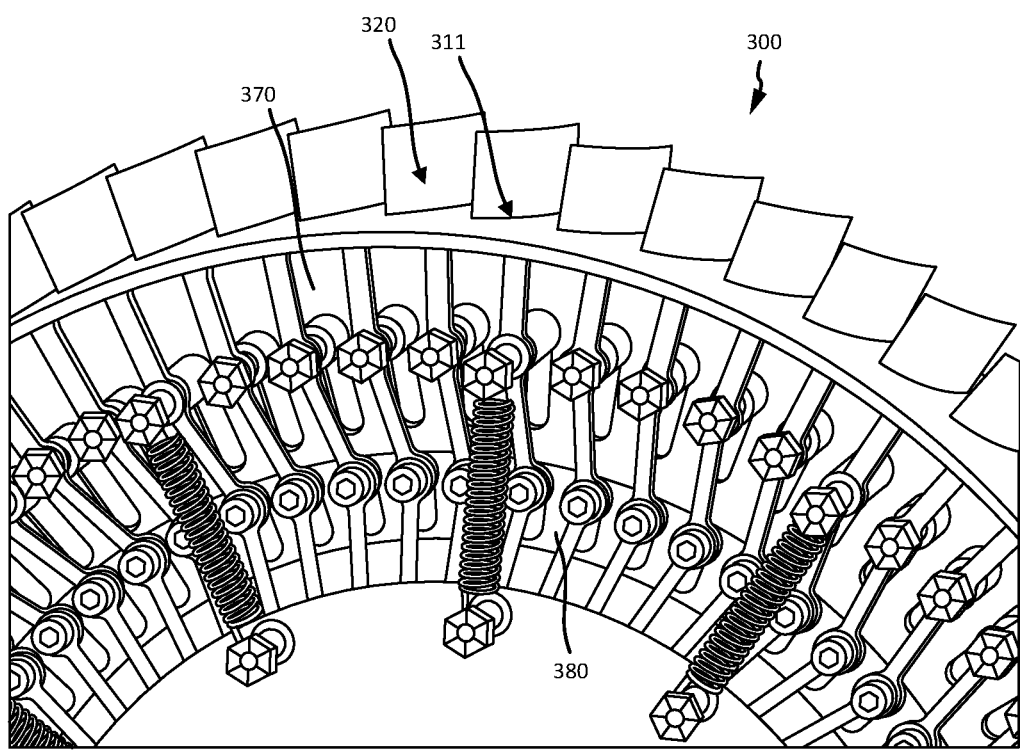
FIG. 6 illustrates a portion of a boost compressor assembly in a deployed state, in accordance with various embodiments.

Referring now to FIG. 6, a perspective view of a portion of a boost compressor assembly 300 in a deployed state, in accordance with various embodiments, is illustrated. In various embodiments, in the deployed state, the plurality of blades extend radially through the plurality of apertures 311. In various embodiments, the first intermediate annular structure 370 and the second intermediate annular structure 380 may be disposed axially adjacent to each other.

Figures 7A, 7B:
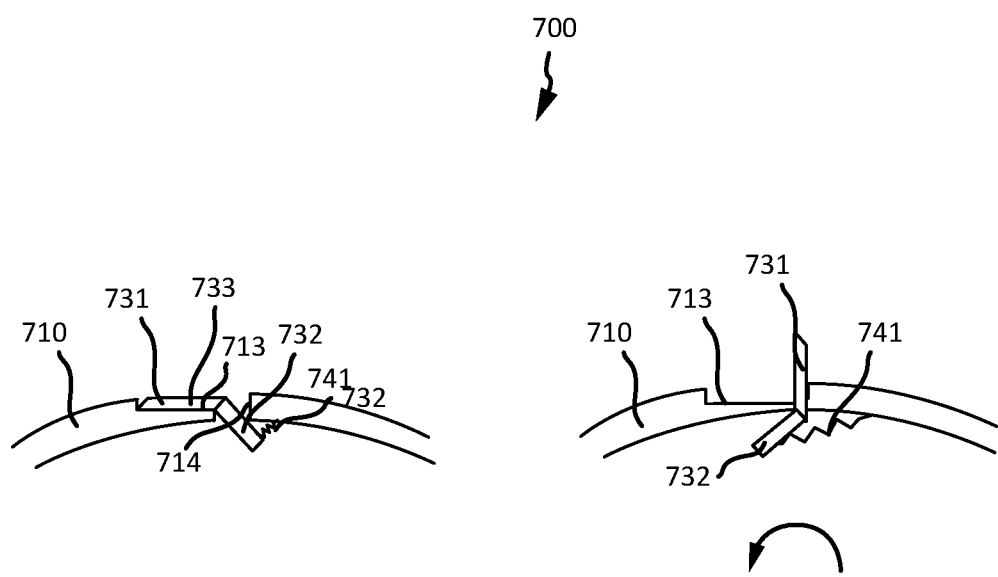
FIG. 7A illustrates a schematic of a portion of a boost compressor assembly in a retracted state, in accordance with various embodiments.
FIG. 7B illustrates a schematic of a portion of a boost compressor assembly in a deployed state, in accordance with various embodiments.

Referring now to FIG. 7A, a schematic of a portion of a boost compressor assembly 700, in accordance with various embodiments, is illustrated. Boost compressor assembly 700 may comprise a blade 731 pivotably coupled to an outer annular structure 710. Blade 731 may comprise a platform 732 and an airfoil 733. Platform 732 may be disposed at least partially radially inward from the outer annular structure 710. Outer annular structure may comprise a recess 713 and an aperture 714. The recess 713 may extend radially inward from an outer surface of the outer annular structure 710. The recess 713 may be configured to house the airfoil 733 when the boost compress assembly is in a retracted state. The aperture 714 may be disposed proximate a pivot point of blade 731. The aperture 714 may extend radially through the outer annular structure.

The boost compressor assembly 700 may further comprise a spring 741 disposed between the platform 732 and a radially inner surface of outer annular structure 710. In various embodiments, in a retracted state, spring 741 may be neutral (i.e., neither in compression or tension).

The boost compressor assembly 700 may be configured to deploy and retract during operation by mechanical means. For example, with reference now to FIG. 7B, when boost compressor assembly 700 begins to rotate a centripetal force may overcome a spring force of the spring 741 and deploy the blade 731. As such, the blade 731 may be configured to deploy from the retracted state to a deployed state. In various embodiments, the spring 741 may be in tension while blade 731 is in the deployed state. As the boost compressor assembly 700 stops rotating, the spring 741 may pull the platform 732 toward the outer annular structure 710 and pivot the airfoil back into the recess 713. As such, the blade may be configured to retract the blade 731 from the deployed state to the retracted state. In various embodiments, a boost compressor assembly 700 may comprise a plurality of the blade 731 disposed circumferentially around the outer annular structure 710.

Figure 8A:
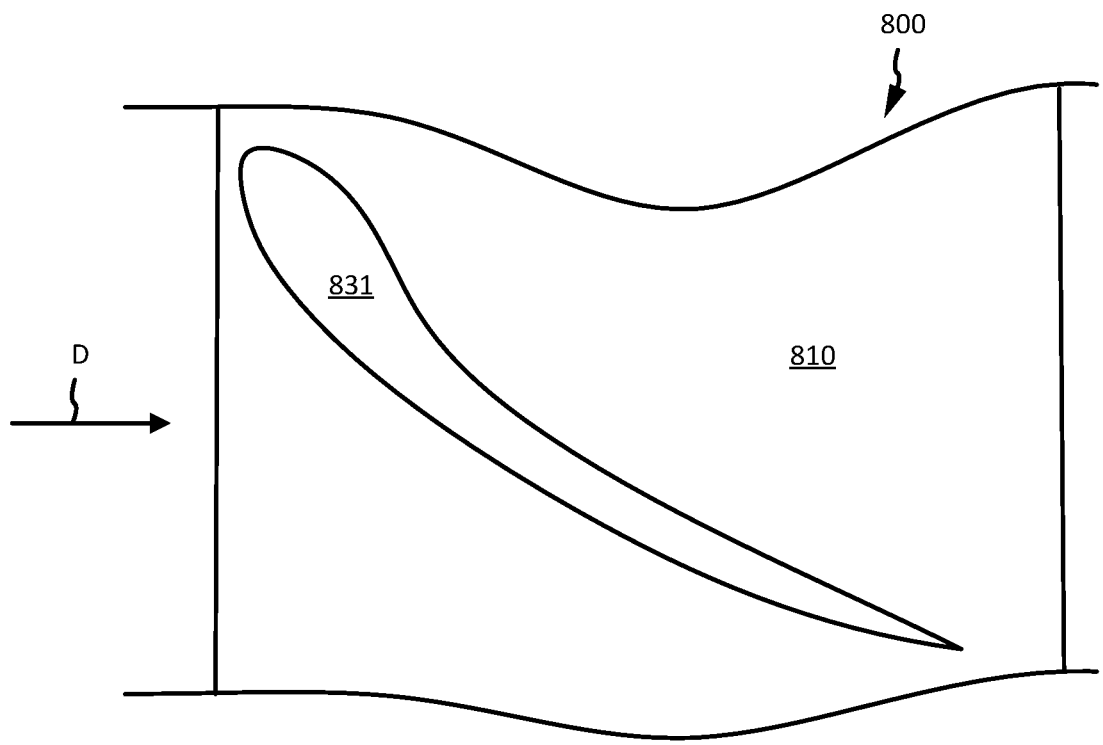
FIG. 8A illustrates a schematic of a portion of a boost compressor assembly in a retracted state, in accordance with various embodiments.

Referring now to FIG. 8A, a top down view of a schematic of a portion of a boost compressor assembly 800 in a deployed state, in accordance with various embodiments, is illustrated. The boost compressor assembly 800 may comprise a blade 831 rotatably coupled to the outer annular structure 810. In the deployed state, boost compressor assembly 800 may be configured for operation as a compressor.

Figure 8B:
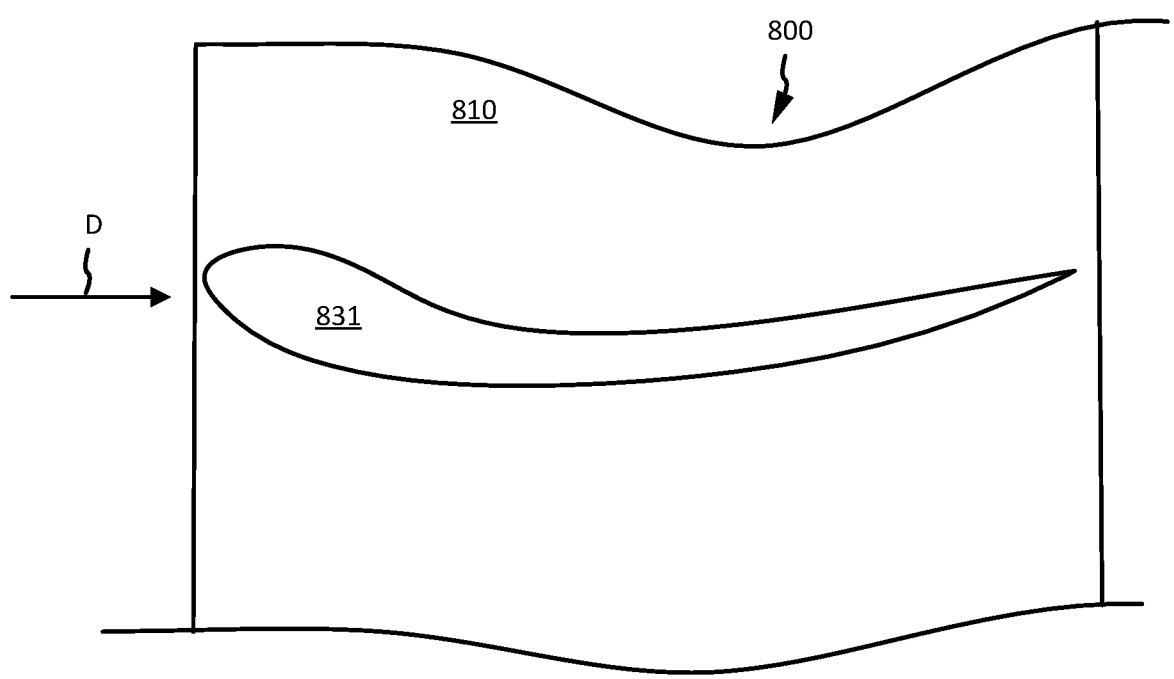
FIG. 8B illustrates a schematic of a portion of a boost compressor assembly in a deployed state, in accordance with various embodiments.

Referring now to FIG. 8B, a top down view of a schematic of a portion of a boost compressor assembly 800 in a retracted state, in accordance with various embodiments, is illustrated. In the retracted state, the blade 831 may be rotated about an outer surface of the outer annular structure 810 to be aligned more symmetrically (i.e., closer to parallel) with the airflow D. In this regard, the blade may provide significantly reduced losses compared to a typical stopped rotor.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A boost compressor assembly, comprising:
an outer annular structure including an aperture disposed radially through the outer annular structure; and
a blade including a platform and an airfoil, the blade moveably coupled to the outer annular structure, the airfoil configured to deploy from the outer annular structure from a retracted state to a deployed state, wherein the blade is configured to transition from the retracted state to the deployed state in response to rotating the boost compressor assembly, and wherein the blade is configured to transition from the deployed state to the retracted state in response to the boost compressor assembly stopping.

2. The boost compressor assembly of claim 1, further comprising an inner annular structure disposed radially inward from the outer annular structure and a link assembly coupled to the inner annular structure and the platform.

3. The boost compressor assembly of claim 2, further comprising a spring coupled to the inner annular structure and the link assembly.

4. The boost compressor assembly of claim 3, wherein the link assembly comprises a joint coupling a first link to a second link, and wherein the spring is coupled to the joint.

5. The boost compressor assembly of claim 4, further comprising an intermediate annular structure disposed between the outer annular structure and the inner annular structure, wherein the intermediate annular structure comprises a radial slot, wherein at least a portion of the joint is disposed in the radial slot, and wherein the joint is configured to travel radially within the radial slot.

6. The boost compressor assembly of claim 1, wherein the blade is pivotably coupled to the outer annular structure.

7. The boost compressor assembly of claim 1, wherein the airfoil is configured to travel radially outward through the aperture when transitioning from the retracted state to the deployed state.

8. The boost compressor assembly of claim 1, wherein the airfoil is disposed radially inward from the outer annular structure when the blade is in the retracted state, and wherein the airfoil is disposed radially outward from the outer annular structure in the deployed state.

9. The boost compressor assembly of claim 1, wherein the blade is rotatably coupled to the outer annular structure.

10. A gas turbine engine comprising:
a rotating detonation engine; and
a boost compressor assembly disposed forward of the rotating detonation engine, the boost compressor assembly configured to increase a ram compression of the rotating detonation engine in response to the boost compressor assembly being in operation, the boost compressor assembly comprising:
an outer annular structure; and
a blade coupled to the outer annular structure.

11. The gas turbine engine of claim 10, wherein the boost compressor assembly further comprises an inner annular structure disposed radially inward from the outer annular structure and a link assembly coupled to the inner annular structure and the blade.

12. The gas turbine engine of claim 11, wherein the boost compressor assembly further comprises a spring coupled to the link assembly and the inner annular structure.

13. The gas turbine engine of claim 12, wherein the link assembly comprises a joint coupling a first link to a second link, and wherein the spring is coupled to the joint.

14. The gas turbine engine of claim 13, wherein the boost compressor assembly further comprises an intermediate annular structure disposed between the outer annular structure and the inner annular structure, wherein the intermediate annular structure comprises a radial slot, and wherein at least a portion of the joint is disposed in the radial slot, and wherein the joint is configured to travel radially within the radial slot.

15. The gas turbine engine of claim 10, wherein the blade is pivotably coupled to the outer annular structure.

16. The gas turbine engine of claim 10, wherein an airfoil of the blade is configured to travel radially outward through an aperture of the outer annular structure when transitioning from a retracted state to a deployed state, wherein the airfoil is disposed radially inward from the outer annular structure when the blade is in the retracted state, and wherein the airfoil is disposed radially outward from the outer annular structure in the deployed state.

17. The gas turbine engine of claim 10, wherein the blade is moveably coupled to the outer annular structure.

18. A vehicle assembly, comprising:
a rotating detonation engine; and
a boost compressor assembly disposed forward of the rotating detonation engine, the boost compressor assembly being configured to increase a ram compression of the rotating detonation engine, the boost compressor assembly comprising:
an outer annular structure; and
a blade moveably coupled to the outer annular structure, the blade configured to deploy in response to rotating the boost compressor assembly, the blade configured to retract when the boost compressor assembly stops rotating.

19. The vehicle assembly of claim 18, wherein the blade is disposed radially inward from the outer annular structure when the blade is in a retracted state, and wherein the blade is disposed radially outward from the outer annular structure in a deployed state.

20. The vehicle assembly of claim 18, wherein the blade is pivotably coupled to the outer annular structure.

21. The vehicle assembly of claim 18, wherein the blade is configured to transition from a retracted state to a deployed state in response to rotating the boost compressor assembly, and wherein the blade is configured to transition from the deployed state to the retracted state in response to the boost compressor assembly stopping.

* * * * *